United States Patent [19]

Robinson et al.

[11] 3,994,741

[45] Nov. 30, 1976

[54] PRODUCTION OF BRICKS

[75] Inventors: Gilbert C. Robinson, Clemson, S.C.; Arthur S. Gillespie, Jr.; Ricardo O. Bach, both of Gastonia, N.C.

[73] Assignee: Lithium Corporation of America, Gastonia, N.C.

[22] Filed: Mar. 26, 1975

[21] Appl. No.: 562,354

[52] U.S. Cl. .................................. 106/67; 106/71; 106/73.6
[51] Int. Cl.² ......................................... C04B 33/04
[58] Field of Search ................. 106/67, 68, 71, 73.6

[56] References Cited
UNITED STATES PATENTS

| | | | |
|---|---|---|---|
| 2,976,162 | 3/1961 | Ekdahl | 106/71 |
| 3,215,542 | 11/1965 | Tinker | 106/71 |
| 3,279,930 | 10/1966 | Van Der Beck | 106/67 |
| 3,690,904 | 9/1972 | Spangler | 106/67 |
| 3,879,211 | 4/1975 | Klotz | 106/67 |

*Primary Examiner*—J. Poer
*Attorney, Agent, or Firm*—Wallenstein, Spangenberg, Hattis & Strampel

[57] ABSTRACT

Production of building bricks utilizing as an ingredient thereof, advantageously in substantial or in major proportion of brick-forming compositions or mixtures of ingredients, ore residues obtained from the extraction of lithium values from beta-spodumene. The said residues so utilized result from a process in which beta-spodumene is subjected to a sulfuric acid roast, the lithium values are then extracted from the acid-roast product by an aqueous extraction liquid, followed by neutralization with lime or limestone, and separation of the formed lithium sulfate by filtration, leaving the ore residues which are then utilized in admixture with other ingredients to produce bricks possessing excellent strength and other desirable properties.

16 Claims, No Drawings

PRODUCTION OF BRICKS

The present invention relates to the production of novel building bricks which utilize, as one of the ingredients in the brick-forming compositions or formulations, certain residues resulting from the extraction of lithium values from certain lithium-bearing ores or minerals by certain treatment and extraction procedures, all as is set out and described in detail below. The resulting bricks possess excellent strength and other desirable properties.

In the process of obtaining the lithium values from spodumene ores, it has long been known, and practiced commercially, to treat the mined spodumene ore, in which the spodumene is present as alpha-spodumene, which as-mined ores are generally initially concentrated, for instance, by froth flotation, to increase the alpha-spodumene content thereof, to convert the alpha-spodumene to beta-spodumene. This conversion is accomplished by heat and results in decrepitating the alpha-spodumene and thereby converting it to beta-spodumene. The resulting beta-spodumene is then treated with concentrated sulfuric acid and the acid-treated ore is then roasted at elevated temperatures, after which the thus acid-roasted product is leached with an aqueous liquid, commonly water or other aqueous leaching liquid, to extract lithium sulfate which has been formed and which resulting solution is then further processes, by neutralization, generally with limestone, to recover lithium sulfate, or converted to other lithium compounds such as lithium chloride or lithium carbonate. The residue remaining from the step of extracting the lithium sulfate from the acidroasted product with an aqueous solution or water, after said neutralization, has constituted a waste product which, for many years, has been discarded. The aforesaid process is described in various publications, being disclosed particularly in U.S. Pat. No. 2,516,109.

In an illustrative procedure, for instance, and essentially according to the teachings of the aforesaid patent, the alpha-spodumene containing ore is initially finely ground, as by ball milling or in other grinding equipment, concentrated by froth flotation, then decrepitated by heating or firing it at a temperature of approximately 1100° C; the decrepitated spodumene or ore, in which the alpha-spodumene has been at least largely converted to beta-spodumene, is then again finely ground, as by ball milling or otherwise, to a mesh size in the range where about 85% or more is of the order of 200 mesh or finer, and is then admixed with sulfuric acid. While, broadly speaking, the concentration of the sulfuric acid employed is variable within very wide limits, concentrated sulfuric acid, for instance, of the order of about 70 to 100%, preferably about 90 to 95%, $H_2SO_4$ is used for reasons of economy. The amount of sulfuric acid utilized, in relation to the $Li_2O$ content of the beta-spodumene, is also variable, and may range from an amount of sulfuric acid in proportions of about 30 to 140% in excess over the stoichiometric equivalent of the lithium present.

The roasting of the beta-spodumene with the sulfuric acid is carried out at elevated temperatures which, again, are variable, as shown in the aforesaid patent, but preferably is of the order of about 200° to 500° C, usually about 250° C.

After completion of the acid-roasting step, the lithium sulfate which has been formed in said acid-roasting step is pulped or extracted with a leach liquid, which is commonly water or other aqueous leach liquid, to form a solution containing lithium sulfate, and such free or excess sulfuric acid as is present is neutralized or substantially neutralized with lime or limestone, as described in said patent, and then the reaction mass is filtered, for instance, by means of rotary vacuum filters, such as a Dorr Oliver filter, to separate the solid ore residues from the lithium sulfate brines. The filter cake is then usually water washed after which the filter cake, constituting the ore residues, is removed from the filter screen in any suitable manner, preferably simply by mechanical means.

The ore residues referred to above comprise a waterinsoluble mass which contains variable amounts of water, commonly in the amount of about 23 to 29% by weight of the ore residues left on filtering. The balance of the ore residues includes various solids, one of which is the original beta-spodumene mineral or crystals which, physically, remains little changed from that of the original beta-spodumene except that at least most of the lithium values have been removed, thereby replacing the lithium with hydrogen ions. The other solids of the ore residues include calcium sulfate resulting from the neutralization of the excess sulfuric acid with lime or limestone, excess lime or limestone, and those impurity minerals that are present and remain in the mined and milled spodumene ore. The ore residues vary somewhat in composition depending, for instance, (a) on the extent of beneficiation; (b) the geological variances in the starting alpha-spodumene ore; (c) the amount of sulfuric acid, including the amount of excess over stoichiometric equivalent of $Li_2O$ used to produce lithium sulfate in the roasting step; (d) the amount of lime or limestone, or the amount of excess lime or limestone, used in the neutralization step; and (e) the efficiency of the lithium extraction or, in other words, the extent to which lithium remains in the spodumene after the roasting and leaching steps and is not converted to and recovered as lithium sulfate.

The foregoing process, as previously noted involves the extraction of lithium values from alpha-spodumene ores which, initially, before roasting with sulfuric acid, are decrepitated to produce beta-spodumene which, after the treatment described, results in the production of the aforementioned ore residues. Generally similar, or related, ore residues result from the treatment of petalite ores in processes for the recovery of the lithium values therefrom. It is, however, especially advantageous to utilize, in the production of building bricks in accordance with the present invention, the ore residues derived from the processing of beta-spodumene in the manner generally described above.

The following Table I shows an analysis of an illustrative composite sample of ore residues, starting with alpha-spodumene ores which were initially concentrated by froth flotation and the resulting alpha-spodumene converted to beta-spodumene by heating at about 1050°–1100° C, after which the treatment with sulfuric acid, roasting, leaching, neutralizing, filtering and washing the filter cake was carried out, Sample I representing a partially dried ore residue, and Sample II representing the said residue after further drying to effect the removal of essentially all of the water. For reasons of economy, it is usually advantageous to use the wet ore residues as removed from the filter after the water-washing of the filter cake, which wet ore residues, as stated above, usually contain of the order of about 23 to 29%, commonly about 24%, by weight of water. There is nothing critical about the water content, or the lack of water content, in the ore residues so far as their efficacy proper is concerned in the production of building bricks containing said ore residues.

TABLE I

| CONSTITUENT | (I) % | (II) % |
|---|---|---|
| $SiO_2$ | 46.5 | 49.74 |
| $Al_2O_3$ | 17.4 | 18.6 |
| $Fe_2O_3$ | 3.07 | 3.28 |
| CaO | 10.8 | 11.6 |
| MgO | 0.94 | 1.01 |
| $P_2O_5$ | 0.73 | 0.78 |
| $TiO_2$ | 0.64 | 0.69 |
| $K_2O$ | 1.11 | 1.19 |
| $Na_2O$ | 0.89 | 0.95 |
| $Li_2O$ | 0.66 | 0.71 |
| MnO | 0.30 | 0.32 |
| $CO_2$ | 3.28 | 3.51 |
| $SO_3$ | 7.93 | 8.48 |
| $H_2O$ | 6.52 | 0 |

In the production of building bricks utilizing the ore residues described above, said ore residues are admixed with a material or materials which impart strength to the mixture during the brick drying and firing operations. Also, where the building bricks are formed by extrusion procedures, materials are incorporated into the mixture to provide the necessary plasticity. While the amounts of the ore residues used in the brick-forming mixtures are variable within relatively wide limits, said mixtures usually contain at least 30 weight % of the ore residue, calculated on a dry weight basis, based on the total weight of the brick-forming ingredients calculated on a dry weight basis. The upper limit is a practical one, taking into account the necessity for the presence of a material or materials in amounts sufficient to provide adequate strength during the brick drying and firing steps and, as indicated above, adequate plasticity to the brick-forming mixture or composition, particularly where the bricks are produced by extrusion procedures. In general, the upper weight % range of the ore residue will not exceed about 90% determined and calculated on the bases set forth above. By the use of certain bonding agents, the ore residues could appreciably exceed 90%, approaching close to 100%, for instance of the order of about 98%, of the brick material. In many cases the ore residue will comprise from about 40 to about 80 weight %, based upon the total weight of the dry brick-forming compositions or on the weight of the finished building bricks.

The ingredients used for imparting strength to the building bricks during the drying and firing operations can be those which are commonly used in producing conventional building bricks. They generally comprise clays or clay-like materials, usually so-called bonding clays. These include shales, Alabama Cordova clay, Ohio fireclays, various bentonites, and the like. The proportions are variable, depending upon the strength desired, and such proportions may, for instance, range from about 10 to about 50 or 60%, by weight, calculated on the dry basis, of the brick-forming ingredients compositions. The clays selected to provide good plasticity commonly also impart good strength during the firing operation and, thus, serve the dual role of imparting both desired strength and desired plasticity to the brick-forming compositions. However, if desired, and where indicated, separate ingredients for providing strength and for providing desired plasticity, respectively, can be incorporated into the brick-forming mixture with the ore residue.

Supplemental ingredients can be incorporated into the brick-forming mixture to obtain special effects, if desired, and when used, they will generally be employed in minor proportions, most commonly somewhat under 10% by weight of the brick-forming mixture. Illustrative examples of such supplemental ingredients are (1) manganese ores which, when added, tend to produce somewhat black bricks; (2) cellulose gums which when added generally impart greatly increased plastic strength to otherwise non-plastic clays; and (3) sodium silicate and/or soda ash which when added generally improve extrudability of the brick mixes.

The brick-forming procedures, as such, used in the production of building bricks, utilizing the ore residues pursuant to the novel teachings of the present invention, may generally follow techniques used in making building bricks. Thus, for instance, the ingredients comprising the brick-forming mixture can be tempered with water, mixed in a wet pan mixer or in a pug mill, vacuum de-aired, and then extruded (at a 12 to 30%, but more usually at an 18 to 22%, water content) through a die orifice, cut into desired lengths by a conventional wire cutter, and then dried and fired. Alternatively, and again only by way of illustration, the brick-forming mixture can be damp-pressed, at a moisture content of about 7 to 15%, and pressed in a die at suitable pressure, say in the range of about 3,000 to about 10,000 pounds per square inch pressure, and then dried and fired. Generally, such damp-pressed bricks are not as dense as extruded bricks. Firing temperatures are somewhat variable but will generally fall within the range of about 995° to about 1260° C., and, more commonly, in the range of about 1065° to about 1150° C. Firing may conveniently be carried out in a tunnel kiln which is operated in a conventional manner for the drying and firing of building bricks. Other types of drying and firing kilns can, of course, be employed.

The following examples are illustrative of the practice of the invention. The ore residue employed in a wet ore residue containing about 24% water and which, on the dry basis, corresponds to the analysis of the Sample in TABLE I, which is generally typical although, as previously stated, the composition of the ore residue can vary somewhat. The invention is, moreover, not to be construed as limited by the said examples since, over and above variations in the ore residues, within, however, the definition set forth herein for "ore residue," changes can also readily be made in the brick formulations including proportions of ingredients, firing temperatures, etc., all within the scope of the guiding principles and teachings contained herein. All percentages listed are by weight and on the dry basis, and all temperatures recited are in degrees C.

EXAMPLE 1

Brick-forming compositions are made by thoroughly mixing the wet ore residue with Southern Bentonite clay to produce an extrudable composition containing about 20% water, vacuum extruding to produce bricks and firing, all as indicated in Table II below. The brick-forming mixtures have good plasticity, strength, and firing properties.

TABLE II

| Composition | Firing Time/Temp.° C | % Shrinkage | Density g/ml | % Water Adsorption (Boiled) | Weathering Boiled Then Freeze To — 15° | Color |
| --- | --- | --- | --- | --- | --- | --- |
| 20% Southern Bentonite 80% Ore Residue | Rise about 100°/Hr Until 1150°. Hold 3.5 Hrs. Cool in oven overnight | 11.8 | 2.32 | 1.41 | Passes No Breakage | Buff-light Greenish Gray |
| 10% Western Bentonite 90% Ore Residue | Rise about 100°/Hr Until 1150°. Hold 3.5 Hrs. Cool in oven overnight | 16.5 | 2.23 | 3.26 | Passes No Breakage | Buff-light Greenish Gray |
| 10% Western Bentonite 90% Ore Residue | Rise about 100° C/Hr Until 1150°. Hold 2.25 Hrs. Cool in oven overnight | 8.66 | 1.81 | 21.1 | Passes No Breakage | Tan |

*In place of 10% Western Bentonite clay, there may be used, with 85% of the ore residue, 14% Ohio fireclay and 1% Western Bentonite clay which results in a comparable building brick of a distinctly lower cost than where 10% Western Bentonite clay is used.

EXAMPLE 2

Brick-forming compositions are made by thoroughly mixing the wet ore residue with kaolin and Western Bentonite clay, to produce an extrudable composition containing 18 to 20% water, said composition containing, on the dry basis, 84% ore residue, 10% kaolin and 6% Western Bentonite clay, vacuum extruding said composition to produce bricks, and firing, all as indicated in Table III below. The brick-forming mixtures have good plasticity, strength and firing properties.

TABLE III

| PROPERTY | FIRING TEMP. ° C (1 HOUR SOAK) | | |
| --- | --- | --- | --- |
| | 995 | 1040 | 1150 |
| MOR psi (Modulus of Rupture) | 927 | 970 | 1048 |
| TOTAL LINEAR SHRINKAGE % | 4.20 | 5.00 | 6.10 |
| APPARENT DENSITY gm/cm³ | 1.79 | 1.75 | 1.72 |
| ABSORPTION % | 21.48 | 16.33 | 11.68 |
| COLOR | Buff | Buff | Tan |

EXAMPLE 3

Brick-forming compositions are made by thoroughly mixing the wet ore residue with varying proportions of alluvial clay, a commonly used red-firing brick clay, to produce an extrudable composition containing 18 to 20% water, vacuum extruding to produce bricks, drying, and firing for 4 hours at about 1120° C. The brick-forming mixtures have good plasticity, strength and firing properties. Results are set out in the following Table IV:

TABLE IV

| Mix | Modulus of Rupture PSI | Linear Shrinkage % | Apparent Density gm/cm³ | Absorption % | Color |
| --- | --- | --- | --- | --- | --- |
| 80% Ore Residue 20% Alluvial Clay | 2922 | 14.0 | 2.09 | 9.42 | Brown |
| 60% Ore Residue 40% Alluvial Clay | 1220 | 4.4 | 1.61 | 21.24 | Light Red |
| 40% Ore Residue 60% Alluvial Clay | 873 | 3.6 | 1.63 | 20.08 | Red |

EXAMPLE 4

Brick-forming compositions are made by thoroughly mixing the wet ore residue with varying percentages of Alabama Cordova clay to produce an extrudable composition containing about 18 to 20% water, vacuum extruding to produce bricks and firing at 1150° C, all as indicated in Table V below. Brown bricks of beautiful appearance are obtained. The brick-forming mixture has good plasticity, strength and firing properties.

TABLE V

| Composition wt. % | Linear Drying Shrinkage % | Linear Firing Shrinkage % | Absorptions Cold % | Absorptions Boiling % | C/B Ratio | Modulus of Rupture psi |
| --- | --- | --- | --- | --- | --- | --- |
| 60 Ore Residue, 40 Cordova Clay | 1.5 | 5.7 | 3.7 | 9.5 | 0.38 | 2533 |
| 70 Ore Residue, 30 Cordova Clay | — | — | 3.6 | 6.0 | 0.60 | 2270 |
| 75 Ore Residue,* 25 Cordova Clay | 3.4 | 7.6 | 1.8 | 2.9 | 0.62 | 4050 |

*0.22% sodium silicate added to improve plasticity

EXAMPLE 5

A brick-forming mixture made as described in Example 4 containing 60% ore residue and 40% Alabama Cordova clay fired at about 1080° C produces beautiful pinkish tan bricks. Cold Absorption is 15.8%; Boiling Absorption is 17.6%; C/B is 0.90; and MOR is 550 psi.

EXAMPLE 6

A "hand-made" brick is formed by pressing neat ore residues combined only with approximately 20% water into a mold, drying at ambient room conditions, and then firing at 1150° C for approximately an hour. A porous tan-colored brick results. While bricks made from ore residues alone, that is, without a bonding agent, are quite low in strength in their pre-fired condition, and thus would not support numerous additional bricks on a kiln car, this example indicates that bricks can be made from ore residues alone, provided that limited loading of the unfired bricks is exercised.

Among the particular embodiments of bricks which can be formed in accordance with the teachings of the present invention are those which contain about 80% of the ore residue as hereafter defined, and in which the balance of the brick comprises about 10% kaolin and about 10% Western Bentonite clay; those which contain from about 40 to 80% of the ore residue as hereafter defined, and in which the balance of the brick constitutes about 60 to about 20% alluvial clay; and those which contain from about 60 to 75% of the ore residue as hereafter defined, and in which the balance of the brick constitutes about 40 to about 25% Cordova clay.

The water required to produce brick-forming compositions of a proper consistency for shaping into building bricks by extrusion or by other brick-forming or shaping operations can be derived in whole or in part from a wet ore residue, or from such water as may be present in a clay or clay-like ingredient supplying strength and/or plasticity, or from extraneous sources, suitable adjustments being made to provide the desired water content in the brick-forming compositions prior to their being shaped into building bricks.

While, as described above, the invention has its greatest value where the ore residues utilized are those derived from the treatment of spodumene ores, as described above, the invention is also of value where the ore residues are derived from the processing of petalite to recover the lithium values therefrom. In the case of petalite, the ore, after beneficiation, is decrepitated and after suitable grinding to desired small particle size, is treated with sulfuric acid and acid-roasted, extracted or leached with water or an aqueous extraction medium, and any excess sulfuric acid neutralized with lime or limestone, and the residues recovered after separation of the lithium sulfate solution as, for instance, by filtration.

For convenience, the term "ore residue" is used in the claims to mean that residue which remains after beta-spodumene or petalite, especially beta-spodumene, is treated with sulfuric acid, heat roasted, extracted with water or an aqueous extracting medium to leach out lithium sulfate, neutralized with lime or limestone in those instances where an excess of sulfuric acid is used in the roasting step so that free sulfuric acid is present to be neutralized, and filtered or otherwise separated to remove the aqueous solution of lithium values, leaving a residue which may or may not be water-washed but which, generally, is water washed before being removed from the filter screen. The residue may be dried to remove a part or substantially all of the water present therein, and the term "ore residue" is, therefore, used to include the dried or undried ore residues which latter, when containing of the order of about 23 to 29% water, are generally in the form of "muds."

What is claimed is:

1. A building brick which comprises a fired composition made from a mixture of ingredients which includes from about 30 to close to 100 weight % of an ore residue and at least one clay-like material in amount to provide strength to the mixture during the brick drying and firing operations, said weight % being based on the dry weight of the brick composition, said ore residue being derived from beta-spodumene or petalite and being the residue which remains after beta-spodumene or petalite is treated with sulfuric acid, heat roasted, extracted with an aqueous extracting medium to leach out lithium sulfate, neutralized with lime or limestone to neutralize free sulfuric acid present from said roasting step, and removing the aqueous solution of lithium values.

2. A building brick according to claim 1, in which said ore residue comprises from about 40 to about 90 weight % of the mixture.

3. A building brick according to claim 1, in which the ore residue is derived from a spodumene ore.

4. A building brick according to claim 2, in which the ore residue is derived from a spodumene ore.

5. A building brick which comprises a fired composition made from a mixture of ingredients which includes from about 30 to close to 100 weight % of an ore residue and at least one clay-like material in amount to provide plasticity to the mixture to enable extrusion of the mixture to form bricks and to provide strength to the mixture during the brick drying and firing operations, said weight % being based on the dry basis of the total brick ingredients, said ore residue being derived from beta-spodumene or petalite and being the residue which remains after beta-spodumene or petalite is treated with sulfuric acid, heat roasted, extracted with an aqueous extracting medium to leach out lithium sulfate, neutralized with lime or limestone to neutralize free sulfuric acid present from said roasting step, and removing the aqueous solution of lithium values.

6. A building brick according to claim 5, in which the ore residue is derived from a spodumene ore.

7. A building brick according to claim 6, in which the ore residue constitutes about 80% and in which the balance of the brick constitutes Southern Bentonite.

8. A building brick according to claim 6, in which the ore residue constitutes about 90% and in which the balance of the brick constitutes Western Bentonite.

9. A building brick according to claim 6, in which the ore residue constitutes about 85%, and in which the balance of the brick constitutes about 14% Ohio fireclay and about 1% Western Bentonite clay.

10. A building brick according to claim 6, in which the ore residue constitutes about 80%, and in which the balance of the brick comprises about 10% kaolin and about 10% Western Bentonite clay.

11. A building brick according to claim 6, in which the ore residue constitutes about 40 to about 80%, and in which the balance of the brick constitutes about 60 to about 20% alluvial clay.

12. A building brick according to claim 6, in which the ore residue constitutes about 60 to about 75%, and in which the balance of the brick constitutes about 40 to about 25% Cordova clay.

13. A building brick-forming composition comprising a mixture of a wet spodumene ore residue having a water content in the range of about 23 to about 29% and at least one clay-like material in amount to provide plasticity for brick formation and strength during the brick drying and firing operations, the ore residue being present in an amount of about 30 to close to 100% on the dry basis of the total ingredients of said building brick-forming composition, said ore residue being derived from beta-spodumene or petalite and being the residue which remains after beta-spodumene or petalite is treated with sulfuric acid, heat roasted, extracted with an aqueous extracting medium to leach out lithium sulfate, neutralized with lime or limestone to neutralize free sulfuric acid present from said roasting step, and removing the aqueous solution of lithium values.

14. A building brick-forming composition according to claim 13, in which the ore residue is derived from a spodumene ore.

15. A building brick according to claim 1, in which firing has been effected at a temperature in the range of about 995° to about 1260° C.

16. A building brick according to claim 15, in which firing has been effected at a temperature in the range of about 1065° to about 1150° C.

* * * * *